(12) United States Patent
Kondo

(10) Patent No.: US 6,544,683 B2
(45) Date of Patent: Apr. 8, 2003

(54) CYLINDRICAL BATTERY

(75) Inventor: Takeshi Kondo, Kyoto (JP)

(73) Assignee: Japan Storage Battery Co., Ltd., Kyoto (JP)

( * ) Notice: Subject to any disclaimer, the term of this patent is extended or adjusted under 35 U.S.C. 154(b) by 280 days.

(21) Appl. No.: 09/739,654

(22) Filed: Dec. 20, 2000

(65) Prior Publication Data

US 2001/0004503 A1 Jun. 21, 2001

(30) Foreign Application Priority Data

Dec. 20, 1999 (JP) .......................... 11-361914

(51) Int. Cl.$^7$ .......................... H01M 10/36; H01M 2/02
(52) U.S. Cl. .......................... 429/94; 429/164; 429/175; 429/176; 429/225
(58) Field of Search .......................... 429/94, 164, 175, 429/176, 177, 225

(56) References Cited

U.S. PATENT DOCUMENTS 3,081,366 A * 3/1963 Belove
4,444,854 A 4/1984 Hooke .......................... 429/94

OTHER PUBLICATIONS

Japanese Abstract No. 59005568, dated Jan. 12, 1984.
Japanese Abstract No. 05225979, dated Sep. 3, 1993.

* cited by examiner

*Primary Examiner*—John S. Maples
(74) *Attorney, Agent, or Firm*—Sughrue Mion, PLLC

(57) ABSTRACT

The present invention provides a cylindrical battery excellent in impact resistance. A novel cylindrical battery is provided comprising a cylindrical battery main body received in a closed-end cylindrical metallic container, characterized in that the cylindrical battery main body comprises a spirally-wound plate group having two output terminals on the same edge face, a closed-end cylindrical battery jar made of a resin for receiving the spirally-wound plate group and a resin cover for closing the opening of the battery jar, the two output terminals extend to the exterior of the battery jar through two ports formed on the bottom of the battery jar, respectively, and the battery main body is received in the metallic container with the cover disposed at the bottom of the metallic container.

6 Claims, 2 Drawing Sheets

CYLINDRICAL BATTERY

FIELD OF THE INVENTION

The present invention relates to a cylindrical battery.

BACKGROUND OF THE INVENTION

Main batteries which are put to practical use at present include lead acid battery, nickel-cadmium battery, nickel-metal hydride battery, silver oxide-zinc battery, and lithium ion battery.

A lead acid battery comprises lead dioxide as a positive active material, lead as a negative active material and dilute sulfuric acid as an electrolyte and has an operating voltage of about 2 V. This battery has well-balanced quality, reliability and price and finds wide application for use in automobile, electric vehicle, uniterruptible power supply, etc. With the recent technique for the reduction of the size of battery and sealing the battery, this battery has been used more and more for various cordless apparatus.

A nickel-cadmium battery comprises nickel oxyhydroxide as a positive active material, cadmium as a negative active material and an aqueous solution of potassium hydroxide as an electrolyte and has an operating voltage of about 1.2 V. This battery has a small internal resistivity, can be discharged with a large amount of current, a prolonged cycle life and a wide working temperature range and is resistant to overcharging/overdischarging. Therefore, this battery has been widely used mainly for consumers' apparatus.

A nickel-metal hydride battery comprises nickel oxyhydroxide as a positive active material, a hydrogen-storage alloy as a negative active material and an aqueous solution of potassium hydroxide as an electrolyte and has an operating voltage of about 1.2 V. This battery also has a high energy density and thus has been practically used mainly for various consumers' apparatus.

A silver oxide-zinc battery comprises silver oxide as a positive active material, zinc as a negative active material and potassium hydroxide aqueous solution as an electrolyte. This battery has a high output and a high energy density but is expensive. Therefore, a large-sized silver oxide-zinc battery is used mainly for space and deep sea while a small-sized silver oxide-zinc battery has been widely used for watch and desktop electronic calculator.

A lithium ion battery comprises a Li-metal composite oxide such as $LiCoO_2$, $LiNiO_2$ and $LiMn_2O_4$ as a positive active material, a carbonaceous material as a negative active material and an organic solution as an electrolyte and has an operating voltage of 3 V level. Because of its advantages such as high operating voltage, high energy density and no memory effect, this battery finds rapidly growing application for consumers' use.

The foregoing practical batteries are provided in the form of rectangle, cylinder, button, sheet, etc. depending on the purpose.

As well known, a cylindrical battery comprises a plate group obtained by spirally winding a thin positive electrode plate and a thin negative electrode plate with a separator interposed therebetween received in a closed-end cylindrical battery container. Because of capability of being rapidly charged, this type of battery has faced a growing demand for various purposes.

Cylindrical batteries can be roughly divided into two groups, i.e., structure comprising a closed-end cylindrical metallic battery container as a battery jar and structure comprising a closed-end cylindrical resinous battery container as a battery jar. In the case of the latter structure, a cylindrical battery main body comprising a resinous closed-end cylindrical battery jar may be received in a closed-end metallic container.

In the case where the cylindrical battery is used in such an arrangement that a cylindrical battery main body comprising a resinous closed-end cylindrical battery jar is received in a closed-end metallic container, the conventional form of such a type of cylindrical battery normally comprises a spirally-wound plate group 2 having two output terminals 1a, 1b on the same edge face thereof, a resinous closed-end cylindrical battery jar 3 for receiving the spirally-wound plate group 2, and a cover 4 as shown in FIG. 1. The output terminals 1a and 1b connected to the positive electrode and negative electrode of the spirally-wound plate group 2, respectively, are drawn out of the battery jar through two ports formed in the cover 4, respectively. A cylindrical battery main body 5 is received in the metallic container with the bottom 6 of the battery jar positioned at the same side to the bottom 8 of the metallic container 7. The edge of the metallic container 7 on the opening side thereof is bent toward the cover 4 of the cylindrical battery main body 5 to form a bent portion 9.

However, this structure is disadvantageous in that the cover 4 of the cylindrical battery main body 5 is positioned on the opening side of the metallic container 7 and thus is vulnerable to impact (e.g. falling) possibly resulting in the leakage of electrolyte through the connection between the battery jar 3 and the cover 4.

A countermeasure against the foregoing problem, if any, is to increase the thickness of the cover 4 or the battery jar 3 or increase the size of the bent portion 9 of the battery container 7. However, this countermeasure is disadvantageous in that it adds to the weight of the battery or reduces the energy density of the battery.

SUMMARY OF THE INVENTION

It is therefore an object of the invention to provide a cylindrical battery which exhibits an improved impact resistance without deteriorating the specific energy or energy density.

The foregoing object of the present invention will become apparent from the following detailed description and examples.

The first aspect of the present invention lies in a cylindrical battery comprising a cylindrical battery main body 5 received in a closed-end cylindrical metallic container 7, wherein said cylindrical battery main body 5 comprises a spirally-wound plate group 2 having two output terminals 1a, 1b on the same edge face, a closed-end cylindrical resinous battery jar 103 for receiving said spirally-wound plate group 2 and a resin cover 104 for closing the opening of said battery jar 103, said two output terminals 1a, 1b extend to the exterior of said battery jar through two ports formed on the bottom 106 of said battery jar, respectively, and said cylindrical battery main body 5 is received in said metallic container 7 with said cover 104 disposed at the bottom 8 of said metallic container 7.

The second aspect of the present invention lies in the foregoing cylindrical battery, wherein the cylindrical battery is a secondary battery.

The third aspect of the present invention lies in the foregoing cylindrical battery, wherein the cylindrical battery main body 5 is received in said metallic container 7 and the edge 9 of said metallic container on the opening side thereof is bent toward said cylindrical battery main body 5.

The fourth aspect of the present invention lies in the foregoing cylindrical battery, wherein the battery jar 103 and cover 104 comprise a polyolefin resin and the metallic container 7 comprises aluminum.

The fifth aspect of the present invention lies in the foregoing cylindrical battery, wherein the spirally-wound plate group 2 comprises a positive electrode comprising lead dioxide as an active material and a negative electrode comprising lead as an active material.

BRIEF DESCRIPTION OF THE DRAWINGS

By way of example and to make the description more clear, reference is made to the accompanying drawings in which.

DETAILED DESCRIPTION OF THE INVENTION

The present invention is intended to improve the impact resistance of a cylindrical battery comprising a cylindrical battery main body provided with a spirally-wound plate group having two output terminals on the same edge face received in a closed-end cylindrical metallic container.

In a cylindrical battery having the conventional structure, if the thickness of the cover or battery jar is increased to raise the adhesive strength thereof or the thickness of the metallic case or the size of the bent portion is increased, the reduction of the adhesion between the battery jar and the cover can be inhibited. However, this is accompanied by the reduction of energy density or specific energy.

The present invention has been worked out on the basis of a novel idea that terminals are drawn out through an opening port formed on the bottom of a battery jar and the connection between the battery jar and the cover is disposed on the bottom of a metallic container. Accordingly, the present invention has been accomplished on the basis of a new finding that the foregoing arrangement makes it possible to minimize the damage on the connection between the battery jar and the cover due to composite action such as shock wave and impact on terminals.

The present invention will be further described in the following examples, but the present invention should not be construed as being limited thereto.

EXAMPLE

An embodiment of implication of the present invention will be described with reference to a cylindrical lead acid battery having a nominal capacity of 5 Ah.

An electrode plate substrate having a width of 80 mm and a length of 500 mm was stamped out of a lead alloy sheet having a thickness of 0.6 mm.

Figure 1:
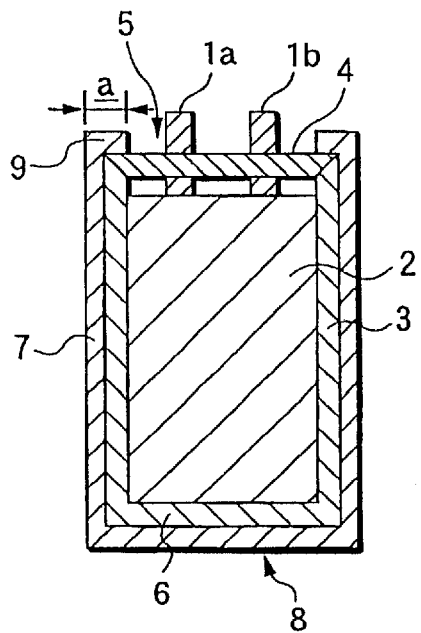
FIG. 1 is a diagram illustrating a conventional example.
Figure 2:
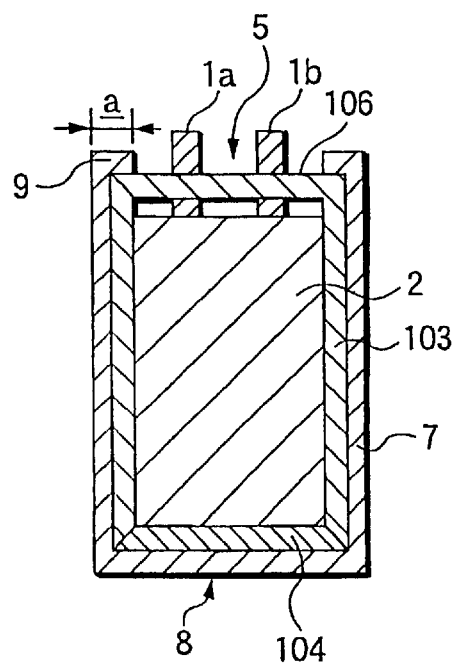
FIG. 2 is a diagram illustrating an embodiment of implication of the present invention.
Figure 3A:
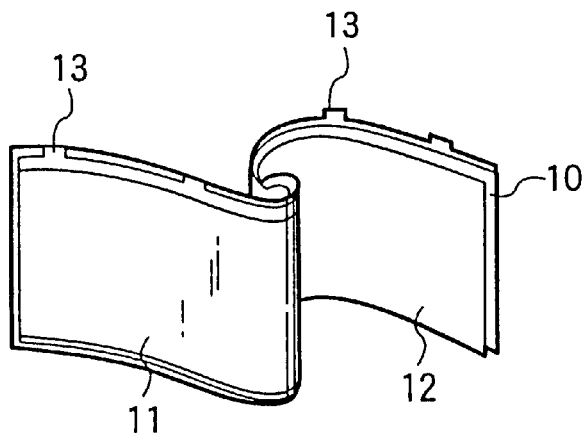
FIGS. 3A and 3B are diagrams illustrating a spirally-wound plate group.

Subsequently, the electrode plate substrate thus formed was used to prepare a positive electrode and a negative electrode. In some detail, the positive electrode was prepared by mixing a leady oxide having an oxidation degree of 70% (metallic lead content: 30%; lead monoxide content: 70%) with dilute sulfuric acid to obtain an active material paste, and then applying the active material paste thus obtained to the foregoing electrode plate substrate on the both surfaces thereof. The theoretical capacity of the positive electrode was 12 Ah. The negative electrode was prepared by adding a slight amount of carbon powder, a barium compound and lignin to a leady oxide having an oxidation degree of 70% (metallic lead content: 30%; lead monoxide content: 70%), mixing the mixture with dilute sulfuric acid to obtain an active material paste, and then applying the active material paste thus obtained to the foregoing electrode plate substrate on the both surfaces thereof. The theoretical capacity of the negative electrode was 16 Ah. The positive electrode 10 and the negative electrode 11 were wound together with a glass mat separator 12 provided interposed therebetween to obtain a spirally-wound plate group 2 as shown in FIG. 3A.

Figure 3B:
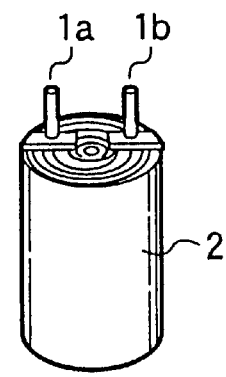

Subsequently, molten lead was poured into a mold having a strap shape carved therein (not shown). Electrode tabs 13 of the spirally-wound plate group 2 which had been inverted were then dipped in the molten lead to a depth of about 1.5 mm before the molten lead is solidified so that they were connected to each other. Thus, a strap was formed by a so-called COS method. Subsequently, a terminal (also referred to as "terminal post") which had previously been welded to the strap thus formed over a burner to prepare a plurality of spirally-wound plate group having two terminals 1a, 1b provided on the same edge face as shown in FIG. 3B. Alternatively, COS method may be carried out using a mold having both a strap shape and a terminal shape carved therein.

Figure 4:
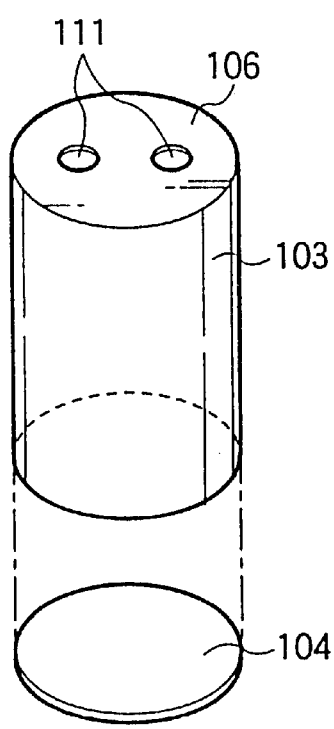
FIG. 4 is a diagram illustrating an embodiment of battery jar and cover according to the present invention.

Subsequently, in order to implicate the present invention, as shown in FIG. 4, a closed-end cylindrical battery jar 103 made of a polyolefin resin having two opening ports 111 on the bottom 106 (shown disposed as the upper surface in FIG. 4 but is called "bottom" for convenience), and a cover 104 made of the same material as mentioned above for closing the battery jar 103, were prepared.

Subsequently, the foregoing spirally-wound plate group 2 was inserted in the foregoing battery jar 103 with the terminals 1a, 1b positioned forward so that the terminals 1a, 1b were drawn from the bottom 106 through the opening ports 111. The clearance between the opening port 111 and the terminal 1a or 1b was then sealed with an O-ring made of an acid-resistant rubber. The cover 104 and the battery jar 103 were ultrasonically bonded to each other. In this manner, an unimpregnated battery having an outer diameter of 55 mm and a height of 120 mm (excluding the terminal portion) was obtained.

Figure 5:
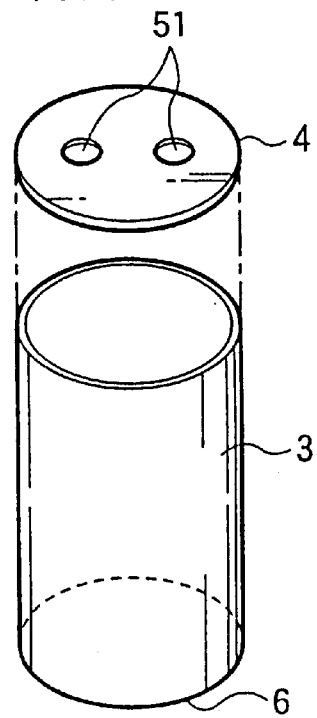
FIG. 5 is a diagram illustrating battery jar and cover of conventional example, wherein the reference numeral 1 indicates a terminal, the reference numeral 2 indicates a spirally-wound plate group, the reference numeral 3 indicates a battery jar, the reference numeral 4 indicates a cover, the reference numeral 5 indicates a battery main body, the reference numeral 6 indicates the bottom of a battery jar, the reference numeral 7 indicates a metallic container, the reference numeral 8 indicates the bottom of a metallic container, the reference numeral 9 indicates a bent portion, the reference numeral 103 indicates a battery jar, the reference numeral 104 indicates a cover, and the reference numeral 106 indicates the bottom of a battery jar.

Subsequently, in order to implement a conventional example, as shown in FIG. 5, a closed-end cylindrical battery jar 3 and a cover 4 having an opening ports 51, both made of a polyolefin resin, were prepared. The foregoing spirally-wound plate group 2 was then inserted in the foregoing battery jar 3 with the terminals 1a, 1b positioned forward. The clearance between the terminal 1a or 1b and the opening port 51 was then sealed in the same manner as mentioned above. The battery jar 3 and the cover 4 were bonded to each other in the same manner as mentioned above. In this manner, an unimpregnated battery was obtained. The size of this battery was the same as mentioned above.

Subsequently, an aqueous solution of dilute sulfuric acid having a predetermined specific gravity was injected into the foregoing unimpregnated battery through an injection port (not shown) under reduced pressure. The battery jar was then subjected to formation with a constant current of 0.25 CA for 40 hours to obtain a cylindrical sealed lead acid battery main body 5.

Subsequently, these battery main bodies 5 were each received in a closed-end cylindrical container 7 made of aluminum having an inner diameter of 55 mm and a thickness of 1 mm. The opening edge of the container 7 was bent toward the battery main body to form an annular bent portion 9. In this manner, a cylindrical battery having a cylindrical battery main body received in a closed-end cylindrical metallic container was obtained. The size of the bent portion a was 2.5 mm.

The cylindrical batteries thus obtained were each then subjected to falling test. In some detail, 10 samples for each of the battery of the invention and the conventional battery were each allowed to fall onto a concrete floor from a height of 1 m with the bottom 8 thereof facing downward 10 times.

As a result, the battery of the invention underwent leakage of electrolyte through the connection between the cover and the battery jar at a ratio of one out of the ten samples while the conventional battery underwent leakage of electrolyte at a ratio of 4 out of the ten samples. The reason for this significant difference is presumably because that the conventional battery is liable to damage on the connection between the battery jar and the cover due to vibration of the cover or the interaction of the cover with the terminal caused by shock wave while the battery of the invention has its cover pressed against the bottom of the metallic container so that it can be protected against destruction of the connection between the battery and the cover due to shock wave.

The samples of cylindrical battery which had been found to have no abnormalities were each subjected to charge-discharge cycle test, i.e., discharged with 1 CA (terminated at 1.7 V) and charged with a constant current of 1 CA at a constant voltage of 2.45 V (for 1.5 hours). As a result, the battery of the invention underwent leakage of electrolyte through the connection between the battery jar and the cover at a ratio of 2 out of the 9 samples while the conventional battery underwent leakage of electrolyte at a ratio of 3 out of the 6 samples. These results, too, show that the battery of the invention is superior to the conventional battery.

The present example has been described with reference to the case where a resin battery jar and a resin cover having a thickness of 2 mm and an aluminum container having a thickness of 1 mm are used. However, when a resin battery jar and a resin cover having a thickness of 1 mm or 2.5 mm was used, similar tendency was shown. When an aluminum container having a thickness of 0.5 mm or a container made of nickel-plated steel was used, similar tendency was shown.

The present example has been also described with reference to the case where a lead acid battery is used. However, the present invention can be applied to any cylindrical battery comprising a cylindrical battery main body comprising a spirally-wound plate group having two output terminals on the same edge face thereof received in a closed-end cylindrical metallic container regardless of which it is in the form of nickel-cadmium battery, nickel-metal hydride battery, silver oxide-zinc battery, lithium ion battery, or the like. If the material of the metallic container is apprehended in respect to corrosion resistance, a metal coated with a resin can be used. The present example has been also described with reference to the case where the opening edge of the closed-end cylindrical container 7 in which the battery main body 5 has been received is bent toward the battery main body 5. However, any fixing method other than bending can be used. For example, a push ring may be threaded into the opening of the container.

Even in the conventional arrangement, the reduction of the strength of bonding between the battery jar and the cover due to impact can be accomplished by increasing the thickness of the cover or battery jar to raise the bond strength, increasing the thickness of the metallic case or increasing the size of the bent portion. However, this is accompanied by the reduction of energy density or specific energy. In accordance with the present invention, however, a cylindrical battery excellent in impact resistance can be provided without reducing the specific energy or energy density.

While the invention has been described in detail and with reference to specific embodiments thereof, it will be apparent to one skilled in the art that various changes and modifications can be made therein without departing from the spirit and scope thereof.

What is claimed is:

1. A cylindrical battery comprising a cylindrical battery main body received in a closed-end cylindrical metallic container,
    wherein the said cylindrical battery main body comprises a spirally-wound plate group having two output terminals on the same edge face, a closed-end cylindrical resinous battery jar for receiving said spirally-wound plate group and a resin cover for closing the opening of said battery jar,
    said two output terminals extend to the exterior of said battery jar through two ports formed on the bottom of said jar,
    and said battery main body is received in said metallic container with said cover disposed at the bottom of said metallic container.

2. The cylindrical battery according to claim 1, wherein said cylindrical battery is a secondary battery.

3. The cylindrical battery according to claim 1, wherein said cylindrical battery main body is received in said metallic container and the edge of said metallic container on the opening side thereof is bent toward said cylindrical battery main body.

4. The cylindrical battery according to claim 1, wherein the battery jar and cover comprise a polyolefin resin.

5. The cylindrical battery according to claim 1, wherein the metallic container comprises aluminum.

6. The cylindrical battery according to claim 1, wherein the spirally-wound plate group comprises a positive electrode comprising lead dioxide as an active material and a negative electrode comprises lead as an active material.

* * * * *